(12) United States Patent
Dattalo (10) Patent No.: US 9,436,337 B2
(45) Date of Patent: Sep. 6, 2016

(54) SWITCHED CAPACITANCE TECHNIQUES FOR INPUT SENSING

(71) Applicant: Synaptics Incorporated, San Jose, CA (US)

(72) Inventor: Tracy Scott Dattalo, Santa Clara, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 81 days.

(21) Appl. No.: 14/571,073

(22) Filed: Dec. 15, 2014

(65) Prior Publication Data

US 2016/0170519 A1 Jun. 16, 2016

(51) Int. Cl.
*G06F 3/044* (2006.01)
*G01D 5/24* (2006.01)

(52) U.S. Cl.
CPC .................. *G06F 3/044* (2013.01); *G01D 5/24* (2013.01)

(58) Field of Classification Search
None
See application file for complete search history.

(56) References Cited

U.S. PATENT DOCUMENTS

| 7,307,485 | B1 | 12/2007 | Snyder et al. |
| 7,906,976 | B2 | 3/2011 | Remmers et al. |
| 8,289,034 | B2* | 10/2012 | Kuang ............... G01R 27/2605 324/658 |
| 8,564,313 | B1 | 10/2013 | Ryshtun et al. |
| 8,836,350 | B2 | 9/2014 | Peter |
| 2004/0174209 | A1* | 9/2004 | Makino ..................... G01L 9/04 327/558 |
| 2006/0027804 | A1 | 2/2006 | Yamazaki et al. |
| 2007/0164723 | A1 | 7/2007 | Yanagisawa |
| 2008/0211706 | A1 | 9/2008 | Sutardja |
| 2009/0174416 | A1 | 7/2009 | Ely et al. |
| 2009/0206852 | A1 | 8/2009 | Reynolds |
| 2010/0181180 | A1 | 7/2010 | Peter |
| 2014/0267144 | A1* | 9/2014 | Kwon ..................... G06F 3/044 345/174 |
| 2014/0327455 | A1* | 11/2014 | Steiner Vanha ......... G01D 5/24 324/686 |
| 2015/0029141 | A1* | 1/2015 | Jo ........................... G06F 3/044 345/174 |

* cited by examiner

*Primary Examiner* — Larry Sternbane
(74) *Attorney, Agent, or Firm* — Patterson + Sheridan, LLP (57) ABSTRACT

Examples of the present disclosure generally relate to a switched capacitance technique for input sensing with an input device. A processing system includes an operational amplifier having a non-inverting input, an inverting input, and an output. The processing system further includes a first capacitor coupled between the output and the inverting input to form a feedback path, and a second capacitor. The processing system further includes a first switch coupled to the second capacitor. The first switch has a first state and a second state, where the first state couples the second capacitor to the first capacitor, and the second state couples the second capacitor to a measurement circuit. The processing system further includes a determination module coupled to the measurement circuit and configured to determine a capacitance measurement at the inverting input based on an amount of charge received by the second capacitor.

24 Claims, 7 Drawing Sheets

SWITCHED CAPACITANCE TECHNIQUES FOR INPUT SENSING

BACKGROUND OF THE INVENTION

1. Field of the Invention

Embodiments of the present disclosure generally relate to a switched capacitance technique for input sensing with an input device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes that are configured for transmitting and/or receiving input sensing signals. The electrodes may be coupled to a processing system that determines various characteristics of acquired input sensing signals in order to detect the presence and/or location of an input object. Processing input sensing signals received via the electrodes generally requires large components, such as a number of large capacitors and/or resistors. For example, receiver components may be coupled to each individual electrode (or to each set of electrodes), requiring tens or hundreds of relatively large capacitors and/or resistors to be included in the proximity sensor device. In addition, as the feature size of proximity sensor devices is decreased, the number of receiver components generally must be increased, further increasing the size of the proximity sensor device.

Accordingly, there is a need for reducing the size of components used to perform input sensing in proximity sensor devices.

SUMMARY OF THE INVENTION

Embodiments of the present disclosure generally provide a processing system. The processing system includes an operational amplifier having a non-inverting input, an inverting input, and an output. The processing system further includes a first capacitor coupled between the output and the inverting input to form a feedback path, and a second capacitor. The processing system further includes a first switch coupled to the second capacitor. The first switch has a first state and a second state, where the first state couples the second capacitor to the first capacitor, and the second state couples the second capacitor to a measurement circuit. The processing system further includes a determination module coupled to the measurement circuit and configured to determine a capacitance measurement at the inverting input based on an amount of charge received by the second capacitor.

Embodiments of the present disclosure may further provide an input device for capacitive sensing. The input device includes a plurality of sensor electrodes and a processing system coupled to the plurality of sensor electrodes. The processing system includes an operational amplifier having a non-inverting input, an inverting input, and an output. A sensor electrode included in the plurality of sensor electrodes is coupled to the inverting input. The processing system further includes a voltage source coupled to the non-inverting input, a first capacitor coupled between the output and the inverting input to form a feedback path, a second capacitor, and a first switch coupled to the second capacitor. The first switch has a first state and a second state, where the first state couples the second capacitor to the first capacitor, and the second state couples the second capacitor to a measurement circuit. The processing system further includes a determination module coupled to the measurement circuit and configured to determine a capacitance measurement of the sensor electrode based on an amount of charge received by the second capacitor Embodiments of the present disclosure may further provide a method of input sensing with a sensor electrode. The method includes driving an input voltage onto a non-inverting input of an operational amplifier. A first capacitor is coupled between an output of the operational amplifier and an inverting input of the operational amplifier to form a feedback path. The method further includes switching a second capacitor between a first state and a second state, where the first state couples the second capacitor to the first capacitor, and the second state couples the second capacitor to a measurement circuit. The method further includes determining a capacitance measurement associated with a sensor electrode coupled to the inverting input based on an amount of charge received by the second capacitor.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a method and system for transmitting and receiving input sensing signals using a switched capacitor. Using a switched capacitor to perform input sensing allows the size of a processing system to be reduced. For example, instead of using large capacitors and/or resistors in a processing system, a switched capacitor may be implemented to perform oversampling of an unknown capacitance. Additionally, during oversampling, when the switched capacitor is toggled between the unknown capacitance and a measurement circuit, a separate capacitor may remain coupled to the unknown capacitance, reducing the likelihood of interference aliasing. Accordingly, the overall size of the processing system may be reduced while retaining similar performance characteristics.

Figure 1:
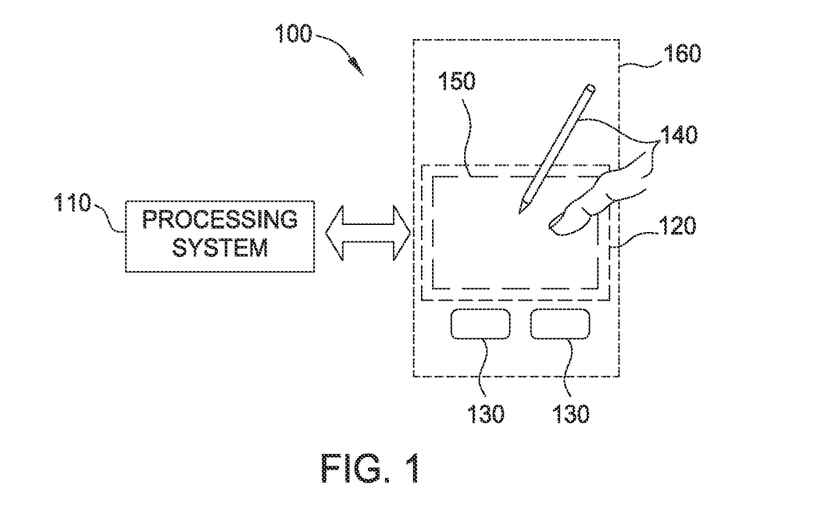
FIG. 1 is a block diagram of an exemplary input device in accordance with embodiments of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include $I^2C$, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In some implementations, an absolute capacitance sensing method operates by modulating sensor electrodes with respect to a reference voltage (e.g. system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. In other embodiments, receiver sensor electrodes may be modulated while resulting signals are received. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Additionally, sensor electrodes may be configured to perform absolute capacitance sensing and/or transcapacitance sensing during distinct time periods, or sensor electrodes may be configured to perform both absolute capacitance sensing and transcapacitance sensing simultaneously, during the same time period(s).

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 includes sensing circuitry that may include driver circuitry and/or receiver circuitry. For example, a processing system 110 for a mutual capacitance sensor device may comprise driver circuitry configured to drive input sensing signals onto the transmitter electrodes and/or receiver circuitry configured to receive signals with receiver electrodes. In other embodiments, the same sensing circuitry is used both to drive input sensing signals onto the sensing elements 150 and to receive resulting signals with the sensing elements 150. Additionally, the processing system 110 may also include electronically-readable instructions, such as firmware code, software code, and/or the like.

In some embodiments, components included in the processing system 110 are located together, such as near sensing elements 150 of the input device 100. In other embodiments, components of processing system 110 are physically separate with one or more components being located close to sensing elements 150 of the input device 100, and one or more components being located elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing elements 150 to detect input, identification modules configured to identify gestures such as mode changing gestures, and mode changing modules for changing operation modes.

In some embodiments, the processing system 110 responds to user input (or lack of user input) in the sensing region 120 directly by causing one or more actions to be performed. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing elements 150 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In additional examples, the processing system 110 may determine positional information, recognize inputs as commands, recognize handwriting, and the like.

"Positional information," as the term is used herein, broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in whole by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
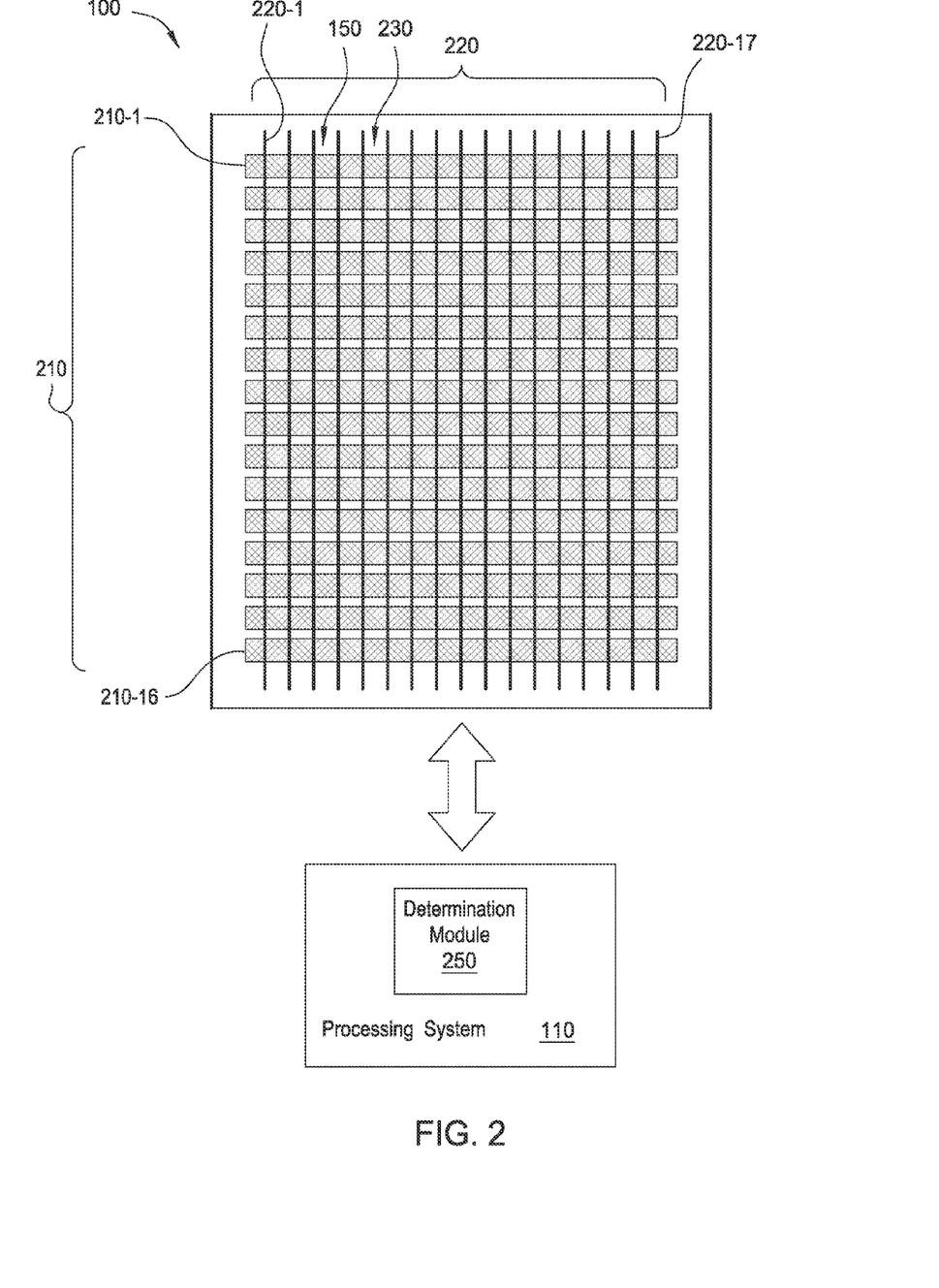
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes sensor electrodes 230, such as a plurality of transmitter electrodes 210 (e.g., 210-1, 210-2, 210-3, etc.) and a plurality of receiver electrodes 220 (e.g., 220-1, 220-2, 220-3, etc.). Although the transmitter electrodes 210 and receiver electrodes 220 are illustrated as being rectangular, in other embodiments, the transmitter electrodes 210 and receiver electrodes 220 may be any practical geometric shape. The processing system 110 is coupled to the array of sensing elements 150, for example, through one or more routing traces (not shown in FIG. 2).

The sensor electrodes 230 may be formed on a substrate that is external to the display device 160. For example, the receiver electrodes 220 may be disposed on the outer surface of a lens of the input device 100, between the color filter glass of the display device 160 and the lens of the input device 100, or between a thin film transistor substrate (TFT substrate) and the color filter glass of the display device 160. In other embodiments, the transmitter electrodes 210 and/or the receiver electrodes 220 include one or more common electrodes that are used to perform input sensing and to update the display device 160.

Although the processing system 110 is illustrated in FIG. 2 embodied as a single integrated circuit (IC) (e.g., an integrated controller), the processing system 110 may include any appropriate number of ICs. For example, the functions of the processing system 110 may be implemented in more than one IC to drive input sensing signals (e.g., via driver circuitry) and/or receive resulting signals (e.g., via receiver circuitry) with the array of sensor electrodes 230. In some embodiments, the processing system 110 includes a determination module 250 that receives resulting signals (e.g., via receiver circuitry) and determines the presence of an input object 140 based on the resulting signals. For example, in some embodiments, the determination module 250 determines a capacitance measurement associated with one or more sensor electrodes 230 based on voltages, currents, charge, etc. received by receiver circuitry. Additionally, the processing system 110 may be configured to drive (e.g., via driver circuitry) a modulated signal onto the at least one sensor electrode 230 to detect changes in absolute capacitance between the at least one sensor electrode and an input object 140.

In some embodiments, one or more ICs of the processing system 110 may be implemented to control display device 160 elements. For example, one IC may be configured to perform input sensing, and another IC may be configured to perform display updating. In some embodiments, one IC may be configured to operate the transmitter electrodes 210, and another IC may be configured to operate the receiver electrodes 220. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100. Accordingly, in such embodiments, no cross-over areas may exist between the transmitter electrodes 210 and the receiver electrodes 220.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include a plurality sensor electrodes 230 disposed in a matrix array, the term "capacitive pixels" may refer to the localized capacitance (e.g., absolute capacitance) between a sensor electrodes 230 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensor electrodes 230 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region 120. For example, successive capacitive images acquired over successive periods of time can be used to track the motion(s) of one or more input objects 140 entering, exiting, and within the sensing region 120.

As described above, the processing system 110 may include sensing circuitry that is coupled to the sensor electrodes. In some embodiments, separate sensing circuitry may be coupled to each sensor electrode. In other embodiments, the sensor electrodes may be grouped into electrode sets that include any number of sensor electrodes (e.g., 2, 4, 8, 16, 32, etc. sensor electrodes per electrode set), and separate sensing circuitry may be coupled to each electrode set. Consequently, the processing system 110 may include tens, hundreds, thousands, etc. of separate sensing circuits.

Figure 3:
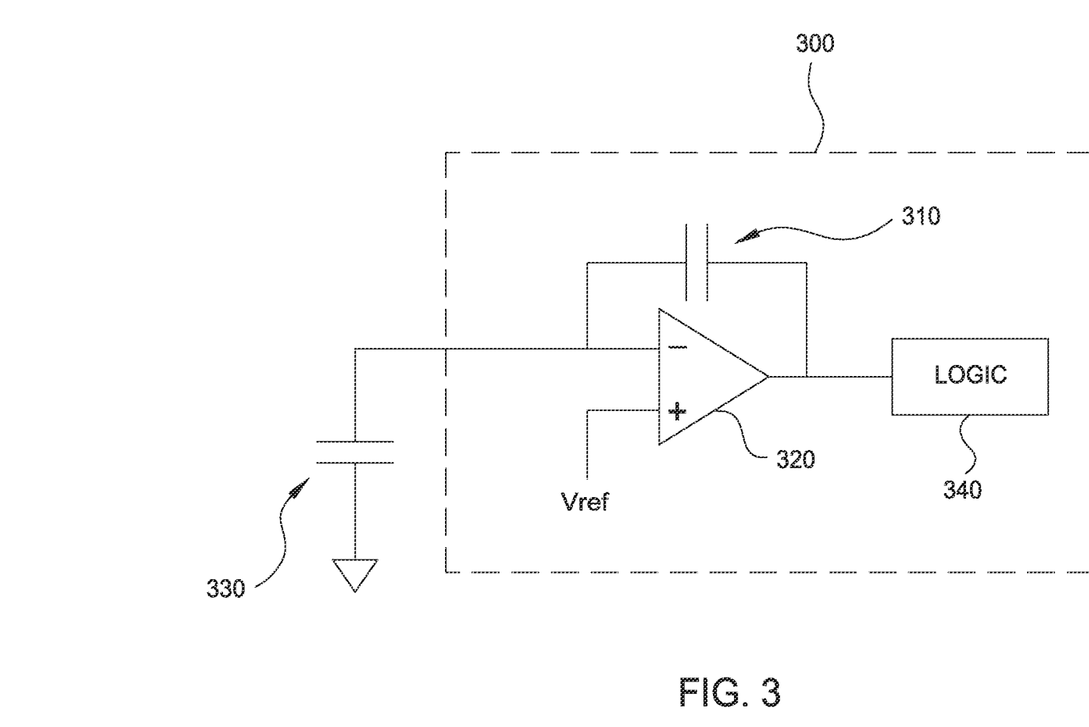
FIG. 3 illustrates a partial schematic view of a sensing circuit for measuring an amount of charge transferred to and/or from an unknown capacitor.

FIG. 3 illustrates a partial schematic view of a sensing circuit 300 for measuring an amount of charge transferred to and/or from an unknown capacitor 330. As shown, the sensing circuit 300 includes a capacitor 310 disposed along a negative feedback path of an operational amplifier 320. During operation of the sensing circuit 300, the capacitor 310 receives charge from and/or transmits charge to the unknown capacitor 330. The amount of charge transferred between the capacitor 310 and the unknown capacitor 330 may then be measured by a logic module 340 in order to determine the capacitance of the unknown capacitor 330.

In general, accurately measuring the capacitance of a sensor electrode requires the capacitor 310 to have a capacitance that substantially equal to or greater than an upper limit of the capacitance of the sensor electrode. As a result, if a separate sensing circuit 300 is coupled to each sensor electrode (or set of sensor electrodes), then the total surface area occupied by all of the sensing circuits 300 may be quite large. Additionally, because the signal gain of the sensing circuit 300 is inversely proportional to the capacitance of the capacitor 310, increasing the size of the capacitor 310 typically causes the signal-to-noise ratio (SNR) of the sensing circuit 300 to be decreased.

Accordingly, in order to reduce the size requirements of sensing circuitry (e.g., driver circuitry and/or receiver circuitry) included in the processing system 110, one or more components within the sensing circuitry may be replaced with a switched capacitance. Replacing one or more sensing circuitry components with a switched capacitance may allow the sensing circuit to measure similar amounts of charge per unit time as compared to sensing circuit 300, while allowing the size of the capacitor(s) included in the sensing circuit to be reduced. Such techniques are described in further detail below in conjunction with FIGS. 4-7.

Switched Capacitance Techniques for Input Sensing

Figure 4:
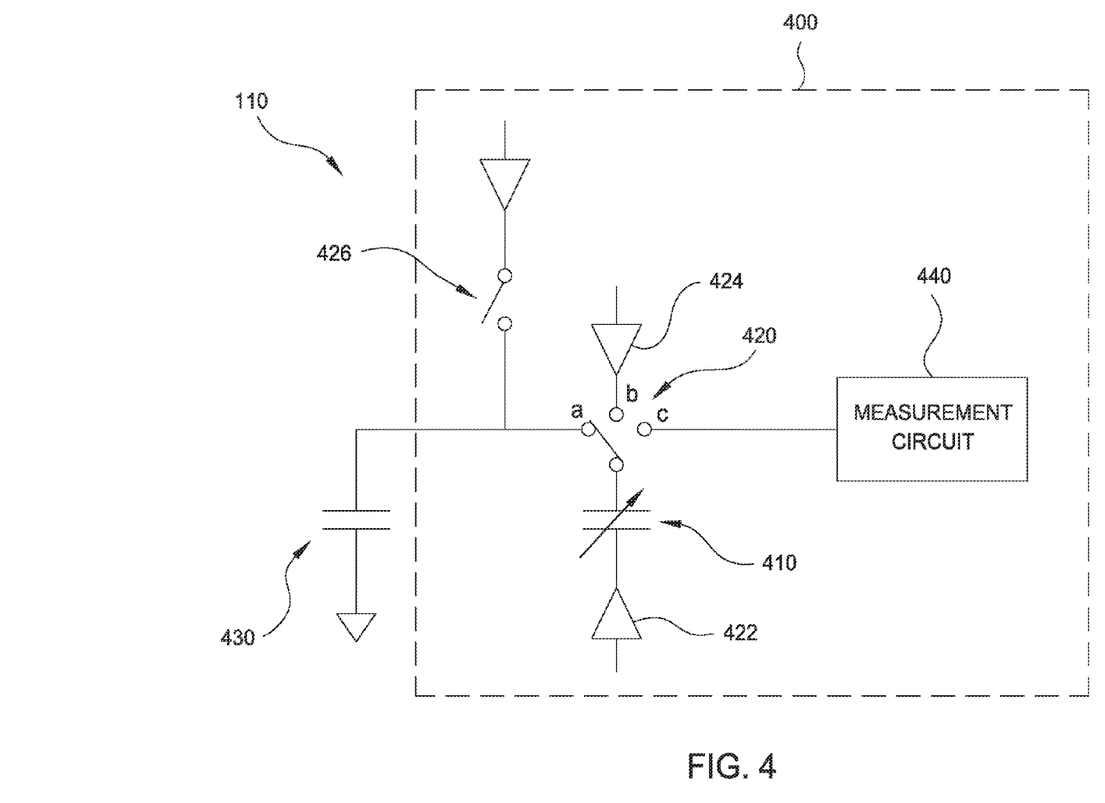
FIG. 4 illustrates a partial schematic view of a sensing circuit which may be included in the processing system of FIG. 1 in accordance with embodiments of the invention.

FIG. 4 illustrates a partial schematic view of a sensing circuit 400 which may be included in the processing system 110 of FIG. 1 in accordance with embodiments of the invention. As shown, the sensing circuit 400 includes a capacitor 410 that is coupled to a first voltage source 422 and a switch 420. The capacitor 410 is capable of being switched between an unknown capacitor 430, a second voltage source 424, and a measurement circuit 440. In some embodiments, the unknown capacitor 430 may include a sensor electrode (e.g., a transmitter electrode 210 or a receiver electrode 220) or a set of sensor electrodes.

During operation of the sensing circuit 400, the capacitor 410 may receive charge from and/or transmit charge to the unknown capacitor 430. For example, if the unknown capacitor 430 is being operated as a transmitter electrode 210, charge may be received from the second voltage source 424 and/or the measurement circuit 440 and transferred to the unknown capacitor 430 in order to drive an input sensing signal onto the unknown capacitor 430. If the unknown capacitor 430 is being operated as a receiver electrode 220, charge received by the capacitor 410 from the unknown capacitor 430 may be transferred to the measurement circuit 440 and/or cancelled out via the first voltage source 422 and/or second voltage source 424. Additionally, a baseline amount of charge may be added to and/or removed from the capacitor 410 and/or the unknown capacitor 430 via a switch 426. Accordingly, the amount of charge transferred between the capacitor 410 and the unknown capacitor 430—and/or the amount of charge cancelled out by the first voltage source 422 and/or second voltage source 424—may be tracked in order to determine the capacitance of the unknown capacitor 430.

In general, when the sensing circuit 400 is driven in an oversampling mode, the size of the capacitor 410 may be reduced relative to the capacitor 310 shown in FIG. 3. For example, when the sensing circuit 400 is driven in an oversampling mode, the switch 420 may be toggled between the unknown capacitor 430, the second voltage source 424, and/or the measurement circuit 440 at a frequency that is higher (e.g., 2, 5, 10, 100, 1000, etc. times higher) than the frequency at which input sensing signals (e.g., square waves) are transmitted to and/or received from the unknown capacitor 430. As a result, charge may be added to and/or removed from the capacitor 410 multiple times during each input sensing cycle. Thus, by oversampling the charge on the unknown capacitor 430, the capacitance of the capacitor 410 may be substantially below the upper limit of the expected capacitance of the unknown capacitor 430.

Although the surface area requirements of sensing circuit 400 are substantially lower than the surface area requirements of sensing circuit 300 (e.g., due to decreased capacitor size requirements), switching the capacitor 410 to the second voltage source 424 or the measurement circuit 440 decouples the capacitor 410 from the unknown capacitor 430. Consequently, if periodic interference is being received by the unknown capacitor 430, this decoupling may alias the periodic interference (e.g., by transmitting some, but not all, of the periodic interference to the capacitor 410), causing inaccurate measurements to be made by the measurement circuit 440. In some embodiments, a frequency dithering filter and/or an analog antialiasing filter may be applied to mitigate such artifacts. Additionally, in the same or other embodiments, the effects of various types of interference may be reduced by combining a charge integrator with a switched capacitance, as described below in further detail in conjunction with FIGS. 5-7.

Figure 5:
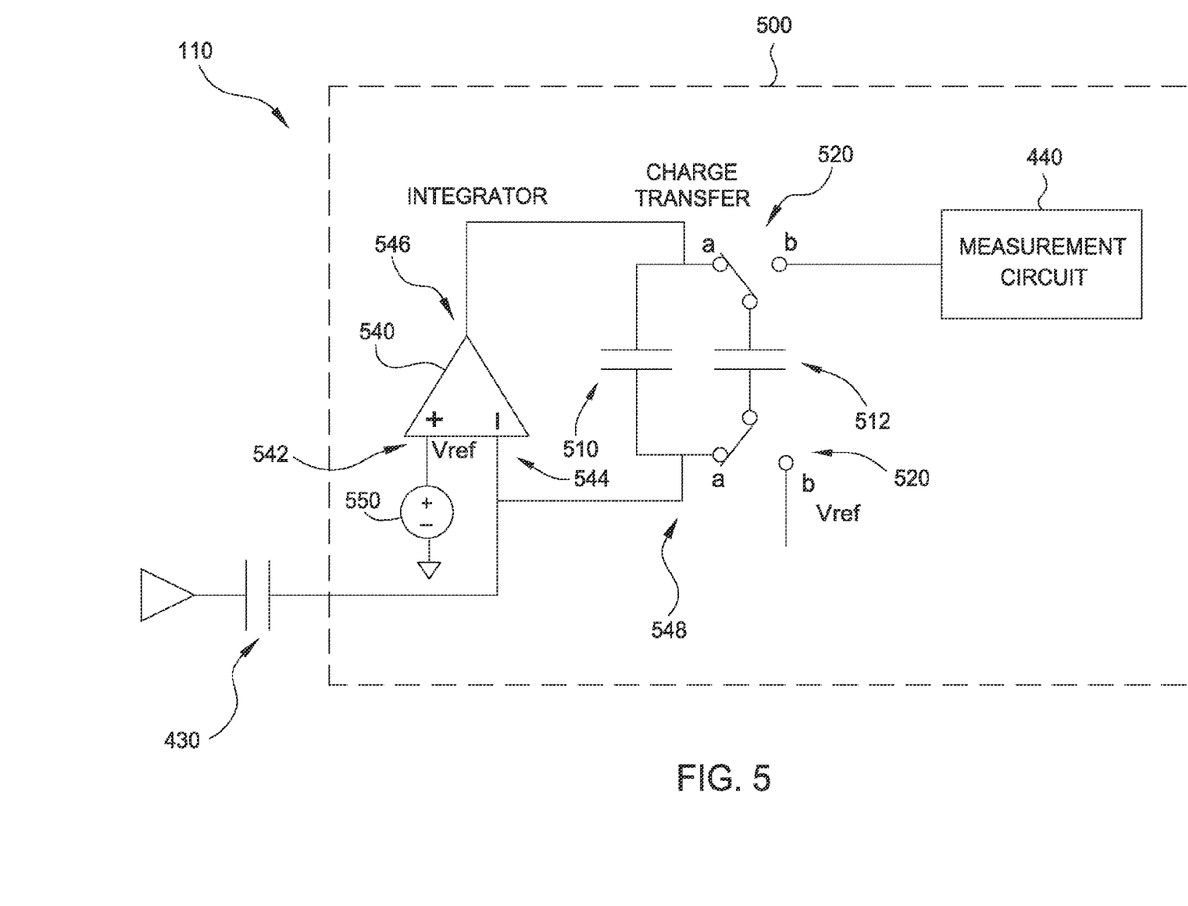
FIG. 5 illustrates a partial schematic view of a sensing circuit, having a switched capacitance and charge integrator, which may be included in the processing system of FIG. 1 in accordance with embodiments of the invention.

FIG. 5 illustrates a partial schematic view of a sensing circuit 500, having a switched capacitance and charge integrator, which may be included in the processing system 110 of FIG. 1 in accordance with embodiments of the invention. The sensing circuit 500 includes a first capacitor 510, a second capacitor 512, an operational amplifier 540, a switch 520, and a measurement circuit 440. The operational amplifier 540 includes a non-inverting input 542, an inverting input 544, and an output 546.

As shown, the first capacitor 510 is coupled between the output 546 of the operational amplifier 540 and the inverting input 544 of the operational amplifier 540 to form a feedback path 548. Additionally, the second capacitor 512 may be switched between the feedback path 548 of the operational amplifier 540 (e.g., a first ("a") state) and the measurement circuit 440 (e.g., a second ("b") state). When the second capacitor 512 is switched to the feedback path 548 of the operational amplifier 540, the first capacitor 510 and the second capacitor 512 are connected in parallel relative to the feedback path 548, enabling both the first capacitor 510 and the second capacitor 512 to receive charge from and/or transmit charge to the unknown capacitor 430. When the second capacitor 512 is switched to the measurement circuit 440, the second capacitor 512 may receive charge from and/or transmit charge to the measurement circuit 440. The amount of charge received from and/or transmitted to the second capacitor 512 may then be tracked by the measurement circuit 440.

In contrast to the sensing circuit 400 of FIG. 4—which requires the capacitor 410 to be decoupled from the unknown capacitor 430 to perform oversampling—the first capacitor 510 included in sensing circuit 500 remains coupled to the unknown capacitor 430 during oversampling. Thus, oversampling may be performed without causing periodic interference to be aliased. Accordingly, the combined size of the first capacitor 510 and the second capacitor 512 may be reduced relative to the size of the capacitor 310 included in the non-oversampling configuration of FIG. 3, while still maintaining similar input sensing performance.

The first capacitor 510 and the second capacitor 512 may have the same capacitance or different capacitances. In some embodiments, the first capacitor 510 and/or the second capacitor 512 may have capacitances that enable charge to be transferred to and/or from the unknown capacitor 430 without saturating either of the capacitors 510, 512. As a result, the sizes of the first capacitor 510 and/or the second capacitor 512 may depend upon the oversampling ratio, where higher oversampling ratios enable the size(s) of the first capacitor 510 and/or the second capacitor 512 to be reduced as compared to lower oversampling ratios.

Additionally, the capacitance of the first capacitor 510 (and, in some embodiments, the capacitance of the second capacitor 512) may depend upon the magnitude of interference that may be received by the capacitor(s) 510, 512 (e.g., via the unknown capacitor 430) during a given oversampling cycle. For example, as the magnitude of actual and/or potential interference is increased, the capacitance(s) of the capacitor(s) 510, 512 may be increased in order to avoid saturating the capacitor(s) 510, 512. In one specific example, if input sensing is performed at approximately 200 kHz and 20:1 oversampling is performed, then each of the first capacitor 510 and/or the second capacitor 512 may have a capacitance of approximately 1 to 5 picofarads (pF), such as approximately 1 to 2 pF. By contrast, if input sensing is performed at approximately 200 kHz and no oversampling is performed, the capacitor 310 of FIG. 3 may have a capacitance of approximately 30 pF.

Switch 520 may be any type of switch that is capable of switching the second capacitor 512 between the feedback path 548 and the measurement circuit 440. In some embodiments, the switch 520 includes a double pole, double throw (DPDT) switch, as shown in FIG. 5. In other embodiments, the switch 520 may include two or more separate switches that switch one or both sides of the second capacitor 512 between the feedback path 548, measurement circuit 440, and/or other components included in the sensing circuit 500.

In various embodiments, additional capacitors may be switched between the feedback path 548 and the measurement circuit 440. For example, instead of including only the second capacitor 512, two or more smaller capacitors (e.g., the second capacitor 512 and a third capacitor) may be coupled in parallel with the first capacitor 510. The two or more smaller capacitors may then be switched independently or simultaneously between the feedback path 548 and the measurement circuit 440. Including the two or more smaller capacitors in the sensing circuit 500 may enable the number of capacitors coupled to the feedback path 548 to be varied as a function of the amount of charge that is to received from and/or transferred to the unknown capacitor 430. For example, during successive oversampling periods, as the amount of charge that needs to be received from or transferred to the unknown capacitor 430 is reduced, the number of capacitors that are actively switched between the feedback path 548 and the measurement circuit 440 may be reduced.

As described above, the unknown capacitor 430 may include one or more sensor electrodes. Consequently, although FIG. 5 illustrates a reference voltage ($V_{ref}$) applied to the operational amplifier 540 and the switch 520, in other embodiments, a voltage source 550 modulates the voltage of the non-inverting input 542, causing the operational amplifier 540 to drive an input sensing signal onto the unknown capacitor 430. For example, in an absolute capacitance sensing configuration, one or more sensor electrodes are coupled to the inverting input 544 of the operational amplifier 540, and the voltage source 550 is configured to drive an input sensing signal (e.g., a square wave, sinusoidal voltage, constant voltage, etc.) onto the non-inverting input 542 of the operational amplifier 540. In response, the operational amplifier 540 outputs the input sensing signal to the first capacitor 510, causing the first capacitor 510 to drive a known amount of charge onto and/or remove a known amount of charge from the sensor electrode(s). Further, changes to the amount of charge stored by the sensor electrode(s) may then be detected by toggling the switch 520 to cause the second capacitor 512 to transfer charge between the sensor electrode(s) and the measurement circuit 440, as described above. Accordingly, by switching the second capacitor 512 between the sensor electrode(s) and the measurement circuit 440, changes to the capacitance of the sensor electrode(s) (e.g., due to the presence or absence of an input object 140) may be determined.

Thus, as discussed above, enabling the second capacitor 512 to be switched between the unknown capacitor 430 and the measurement circuit 440—while keeping the first capacitor 510 coupled to the feedback path 548—enables the size of the sensing circuit 500 to be reduced while still enabling the sensing circuit 500 to accurately determine an amount of charge transferred to and/or received from the unknown capacitor 430. Additional techniques for determining an amount of charge received from and/or transferred to the unknown capacitor 430 are described below.

Figure 6:
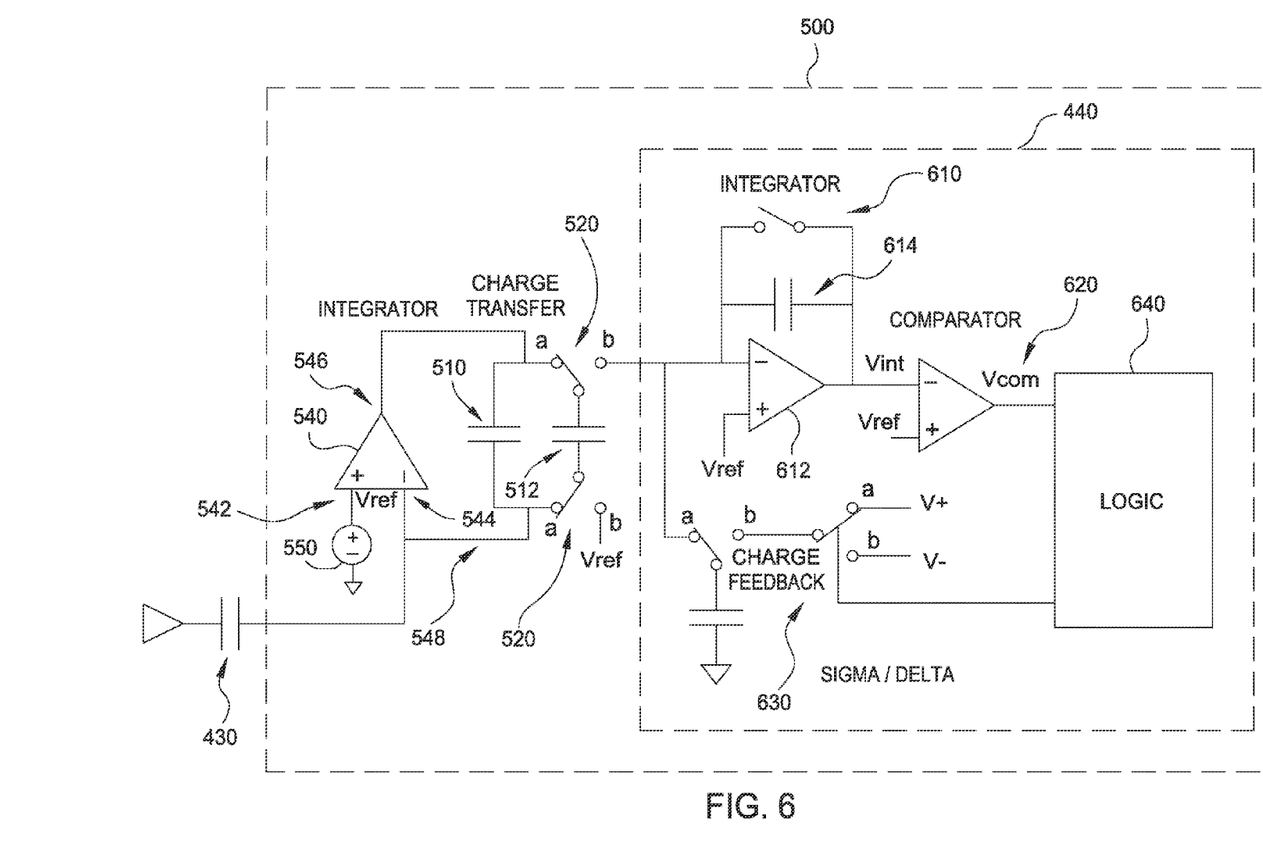
FIG. 6 is a partial schematic view of the sensing circuit of FIG. 5 in which the measurement circuit includes a sigma-delta circuit in accordance with embodiments of the invention.

FIG. 6 is a partial schematic view of the sensing circuit 500 of FIG. 5 in which the measurement circuit 440 includes a sigma-delta circuit in accordance with embodiments of the invention. As shown, the sigma-delta circuit may include an integrator 610, a comparator 620, and a charge feedback circuit 630.

During operation of the sensing circuit 500, the second capacitor 512 is switched to the feedback path 548 of the operational amplifier 540 (e.g., the first state), causing the second capacitor 512 to receive charge from the first capacitor 510 and the unknown capacitor 430. The switch 520 is then toggled to the second state, coupling the second capacitor 512 to the sigma-delta circuit. The operational amplifier 612 and capacitor 614 included in the integrator 610 then receive charge from the second capacitor 512, causing the operational amplifier 612 to output an integrator voltage ($V_{int}$) to the comparator 620.

Next, the comparator 620 compares $V_{int}$ to $V_{ref}$. If $V_{int}$ is greater than $V_{ref}$, then the comparator 620 outputs a negative value to the logic module 640. If, on the other hand, $V_{int}$ is less than $V_{ref}$, then the comparator 620 outputs a positive value to the logic module 640. Then, based on the value received from the comparator 620, the logic module 640 drives $V_{int}$ towards $V_{ref}$. In some embodiments, the logic module 640 drives $V_{int}$ towards $V_{ref}$ by (1) causing the charge feedback circuit 630 to output a positive voltage to the inverting input of the operational amplifier 612 when a negative value is received from the comparator 620, and (2) causing the charge feedback circuit 630 to output a negative voltage to the inverting input of the operational amplifier 612 when a positive value is received from the comparator 620. The logic module 640 then tracks the number of times a negative value and/or a positive value is received from the comparator 620 in order to quantify an amount of charge that has been received via the second capacitor 512.

Although, in the above technique, charge is received from the unknown capacitor 430 (e.g., via the second capacitor 512), in the same or other embodiments, it is contemplated that the sigma-delta circuit included in sensing circuit 400 and/or sensing circuit 500 may be used to track an amount of charge that is transmitted to the unknown capacitor 430 (e.g., via the second capacitor 512). Accordingly, the sigma-delta circuit included in sensing circuit 400 and/or sensing circuit 500 may be used to receive resulting signals from sensor electrode(s) and/or to drive an input sensing signal (e.g., in transcapacitance and/or absolute capacitance sensing modes) onto the sensor electrode(s). For example, the sigma-delta circuit may be used to receive resulting signals from sensor electrode(s) by holding $V_{ref}$ at a substantially constant voltage. Additionally, the sigma-delta circuit may be used to transmit input sensing signals to sensor electrode(s) by modulating $V_{ref}$ (e.g., a square wave, sinusoidal voltage, etc.). Moreover, in various embodiments, the roles of the sensor electrode(s) coupled to the sensing circuits 400, 500 may be switched between different transmitting mode(s) and/or receiving mode(s) during different input sensing time periods (e.g., after each input sensing cycle, after multiple input sensing cycles, or based on some other input sensing pattern).

Figure 7:
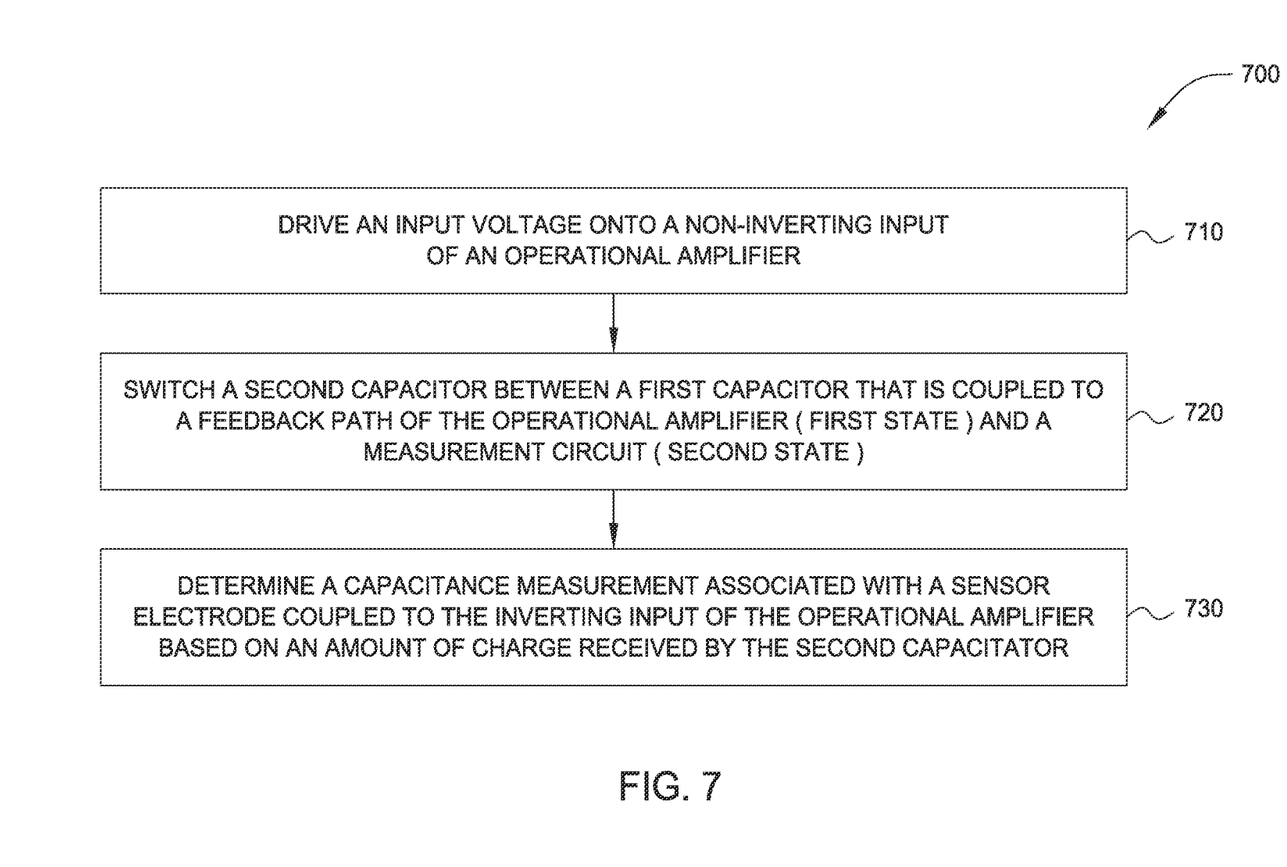
FIG. 7 is a flow chart of a method for performing input sensing using the sensing circuits of FIGS. 5 and 6 in accordance with embodiments of the invention.

FIG. 7 is a flow chart of a method 700 for performing input sensing using the sensing circuits 500, 600 of FIGS. 5 and 6 in accordance with embodiments of the invention. Although the method 700 is described in conjunction with FIGS. 1-6, persons skilled in the art will understand that any system configured to perform the method, in any appropriate order, falls within the scope of the present invention.

The method 700 begins at step 710, where the voltage source 550 drives an input voltage onto the non-inverting input 542 of the operational amplifier 540. As described above, a first capacitor 510 is coupled between the output 546 of the operational amplifier 540 and the inverting input 544 of the operational amplifier 540 to form a feedback path 548. Next, at step 720, the second capacitor 512 is switched between a first state and a second state, where the first state couples the second capacitor 512 to first capacitor 510 and/or the feedback path 548, and the second state couples the second capacitor 512 to the measurement circuit 440.

At step 730, the determination module 250 determines a capacitance measurement associated with the unknown capacitor 430 coupled to the inverting input 544 of the operational amplifier 540 based on an amount of charge received by the measurement circuit 440 via the second capacitor 512.

As described above, in some embodiments, the voltage source 550 may drive a constant voltage onto the non-inverting input 542 of the operational amplifier 540 and/or the voltage source 550 may drive an input sensing signal onto the non-inverting input 542 of the operational amplifier 540. Additionally, the modes of operation of the sensing circuits 500, 600 may be switched between different transmitting mode(s) and/or receiving mode(s) during different input sensing time periods.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system, comprising:
   an operational amplifier having a non-inverting input, an inverting input, and an output;
   a first capacitor coupled between the output and the inverting input to form a feedback path;
   a second capacitor;
   a first switch coupled to the second capacitor, the first switch having a first state and a second state, wherein the first state couples the second capacitor to the first capacitor, and the second state couples the second capacitor to a measurement circuit; and
   a determination module coupled to the measurement circuit and configured to determine a capacitance measurement at the inverting input based on an amount of charge received by the second capacitor.

2. The processing system of claim 1, wherein, when the first switch is in the first state, the first capacitor is connected in parallel with the second capacitor relative to the output and the inverting input.

3. The processing system of claim 1, wherein the first switch comprises a double pole, double throw (DPDT) switch, wherein a first pole of the DPDT switch is coupled to a first side of the second capacitor, and a second pole of the DPDT switch is coupled to a second side of the second capacitor.

4. The processing system of claim 1, wherein the measurement circuit comprises at least one integrator and at least one comparator.

5. The processing system of claim 1, wherein the measurement circuit comprises a sigma-delta modulation circuit.

6. The processing system of claim 1, further comprising a voltage source operable to drive a voltage onto the non-inverting input to cause the operational amplifier to drive an input sensing signal onto a sensor electrode.

7. The processing system of claim 6, wherein the capacitance measurement comprises a capacitance between the sensor electrode and an input object.

8. The processing system of claim 6, wherein the capacitance measurement comprises a capacitance between the sensor electrode and a receiver electrode.

9. The processing system of claim 1, further comprising a voltage source operable to drive a substantially constant input voltage onto the non-inverting input during a mutual capacitance sensing time period.

10. The processing system of claim 1, further comprising:
a third capacitor;
a second switch coupled to the third capacitor, the second switch having a third state and a fourth state, wherein the third state couples the third capacitor to the first capacitor, and the second state decouples the third capacitor from the first capacitor.

11. The processing system of claim 10, wherein the second switch is configured to switch between the third state and the fourth state based on an amount of charge received by the first capacitor.

12. An input device for capacitive sensing, comprising:
a plurality of sensor electrodes; and
a processing system coupled to the plurality of sensor electrodes, the processing system comprising:
an operational amplifier having a non-inverting input, an inverting input, and an output, wherein a sensor electrode included in the plurality of sensor electrodes is coupled to the inverting input;
a voltage source coupled to the non-inverting input;
a first capacitor coupled between the output and the inverting input to form a feedback path;
a second capacitor;
a first switch coupled to the second capacitor, the first switch having a first state and a second state, wherein the first state couples the second capacitor to the first capacitor, and the second state couples the second capacitor to a measurement circuit; and
a determination module coupled to the measurement circuit and configured to determine a capacitance measurement of the sensor electrode based on an amount of charge received by the second capacitor.

13. The input device of claim 12, wherein, when the first switch is in the first state, the first capacitor is connected in parallel with the second capacitor relative to the output and the inverting input.

14. The input device of claim 12, wherein the first switch comprises a double pole, double throw (DPDT) switch, wherein a first pole of the DPDT switch is coupled to a first side of the second capacitor, and a second pole of the DPDT switch is coupled to a second side of the second capacitor.

15. The input device of claim 12, wherein the measurement circuit comprises at least one integrator and at least one comparator.

16. The input device of claim 12, wherein the measurement circuit comprises a sigma-delta modulation circuit.

17. The input device of claim 12, further comprising:
a third capacitor;
a second switch coupled to the third capacitor, the second switch having a third state and a fourth state, wherein the third state couples the third capacitor to the first capacitor, and the second state decouples the third capacitor from the first capacitor.

18. The input device of claim 17, wherein the second switch is configured to switch between the third state and the fourth state based on an amount of charge received by the first capacitor.

19. A method of input sensing with a sensor electrode, the method comprising:
driving an input voltage onto a non-inverting input of an operational amplifier, wherein a first capacitor is coupled between an output of the operational amplifier and an inverting input of the operational amplifier to form a feedback path;
switching a second capacitor between a first state and a second state, wherein the first state couples the second capacitor to the first capacitor, and the second state couples the second capacitor to a measurement circuit; and
determining a capacitance measurement associated with a sensor electrode coupled to the inverting input based on an amount of charge received by the second capacitor.

20. The method of claim 19, further comprising driving a voltage onto the non-inverting input to cause the operational amplifier to drive an input sensing signal onto the sensor electrode.

21. The method of claim 19, wherein the capacitance measurement comprises a capacitance between the sensor electrode and an input object.

22. The method of claim 19, wherein the capacitance measurement comprises a capacitance between the sensor electrode and a receiver electrode.

23. The method of claim 19, further comprising driving a substantially constant input voltage onto the non-inverting input during a mutual capacitance sensing time period.

24. The method of claim 19, further comprising switching a third capacitor between a third state and a fourth state based on an amount of charge received by the first capacitor, wherein the third state couples the third capacitor to the first capacitor, and the second state decouples the third capacitor from the first capacitor.

* * * * *